United States Patent [19]
Hehl

[11] Patent Number: 5,433,594
[45] Date of Patent: Jul. 18, 1995

[54] INJECTION MOLDING UNIT FOR USE IN AN INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 141,995

[22] Filed: Oct. 28, 1993

[30] Foreign Application Priority Data

Oct. 28, 1992 [DE] Germany ............... 42 36 282.2

[51] Int. Cl.[6] ............................................. B29C 45/17
[52] U.S. Cl. ............................ 425/192 R; 425/567; 425/574
[58] Field of Search ............... 425/190, 192 R, 557, 425/567, 574

[56] References Cited

U.S. PATENT DOCUMENTS

| | | | |
|---|---|---|---|
| 3,510,915 | 5/1970 | Johansson | 425/192 R |
| 3,526,931 | 9/1970 | Schwartz | 425/192 R |
| 3,596,326 | 8/1971 | Annis, Jr. et al. | 425/192 R |
| 3,734,667 | 5/1973 | Dray | 425/192 R |
| 4,704,078 | 11/1987 | Hehl | 425/185 |
| 4,731,005 | 3/1988 | Hehl | 425/192 R |
| 4,846,652 | 7/1989 | Hehl | 425/190 |
| 5,332,383 | 7/1994 | Hehl | 425/192 R |

FOREIGN PATENT DOCUMENTS

| | | |
|---|---|---|
| 202433 | 11/1986 | European Pat. Off. |
| 454991 | 11/1991 | European Pat. Off. |
| 548704 | 6/1993 | European Pat. Off. |
| 4142927 | 7/1993 | Germany |

*Primary Examiner*—James P. Mackey
*Attorney, Agent, or Firm*—Spencer, Frank & Schneider

[57] ABSTRACT

In an injection molding unit for use in an injection molding machine for processing synthetic materials a coupling device is applied for coupling the feed screw with a spindle by means of an axial locking device subject to the rotational movement. The locking elements of the axial locking device are received in a seat and are provided with several threaded bolts, which are connected to first bore holes of the spindle and are inclinedly arranged opposite to a plane laid through the axis. That way, in spite of its simple construction, a coupling device easy to maintain and reasonable with respect to the price is created.

9 Claims, 5 Drawing Sheets

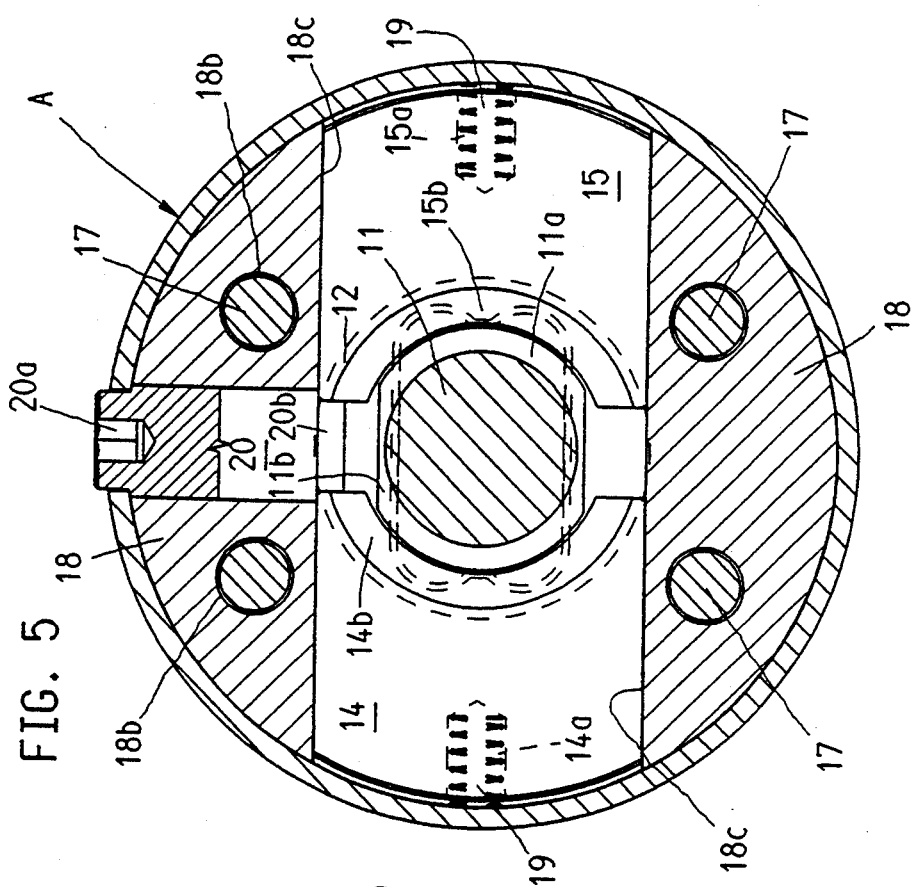
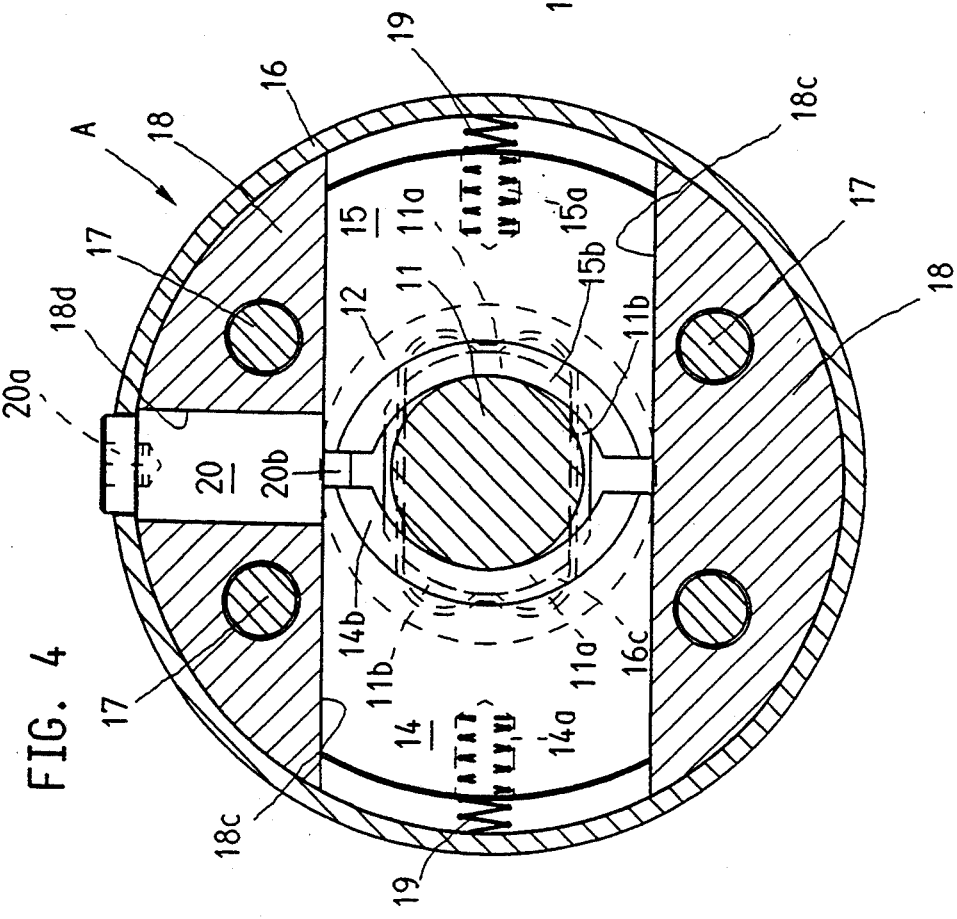

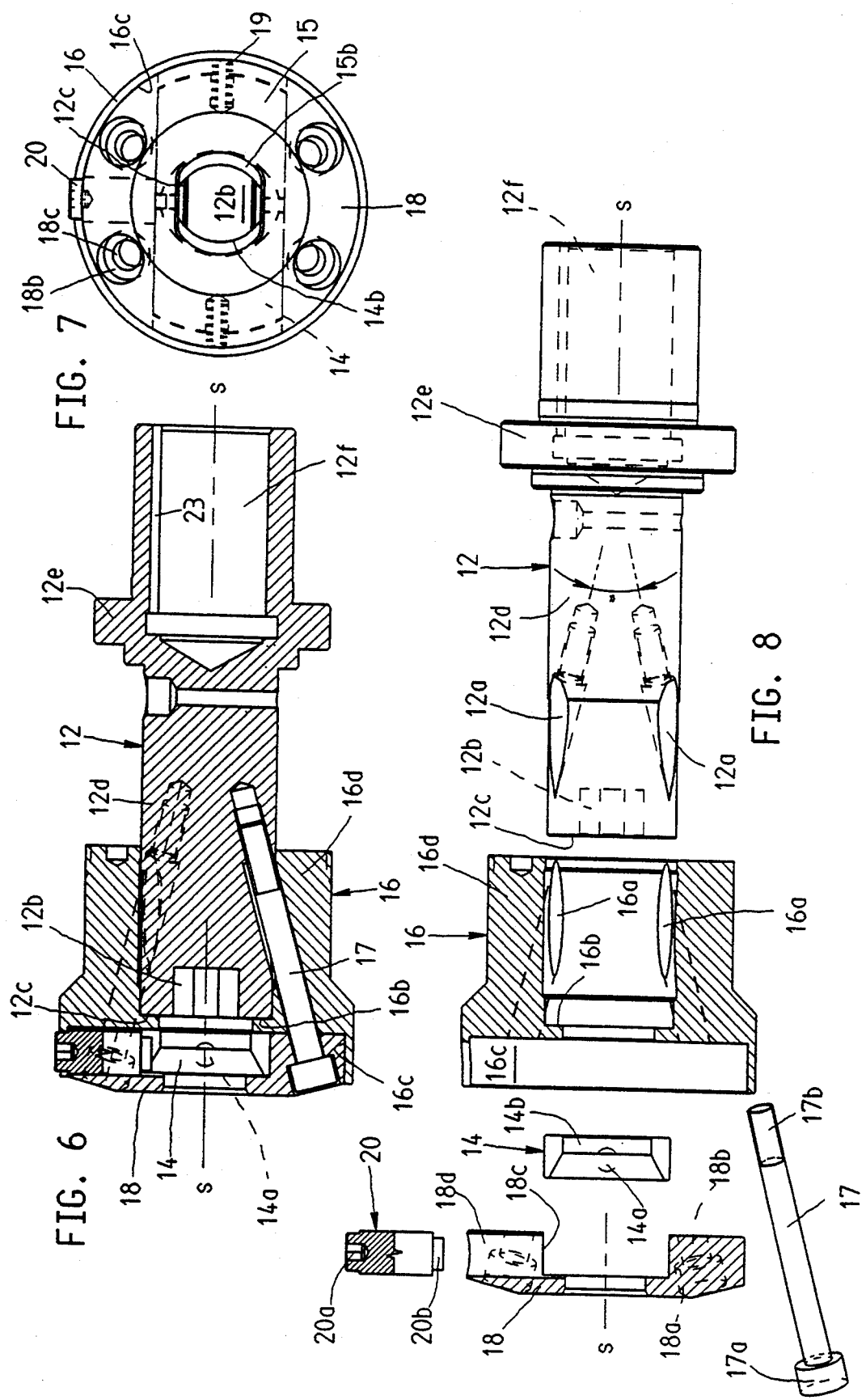

INJECTION MOLDING UNIT FOR USE IN AN INJECTION MOLDING MACHINE FOR PROCESSING SYNTHETIC MATERIALS

CROSS-REFERENCE TO RELATED APPLICATION

This application claims the priority of German Patent Application P 42 36 282.2, filed Oct. 28, 1992, which is incorporated herein by reference.

BACKGROUND OF THE INVENTION

1. Field of the Invention

This invention relates to an injection molding unit comprising a coupling device for use in an injection molding machine for processing synthetic materials, comprising a rotatable and axially displaceable feed screw mounted in a detachable plasticizing cylinder and a drive device constituting a part of the injection molding unit comprising a spindle coaxially arranged with respect to an injection axis. The coupling device is provided for coupling the feed screw with the spindle by at least one axial locking means subject to a rotational movement, whereby at least one locking element constituting a pare of the locking means is received in a seat detachably connected to said drive device and turned towards the feed screw.

2. Description of the Prior Art

A coupling device of this kind is known from U.S. Pat. No. 4,704,078. In this coupling device the rotational movement of a motor is transmitted to a spindle which again transmits this rotational movement on to the feed screw. A radial coupling for the torque transmission and an axial locking means for driving the feed screw during the axial movements required during the injection cycle are provided for coupling the feed screw and the spindle. Two diametrically arranged slides, which are uncouplable by a radially catching expanding key, are provided as axial locking means. The spindle is penetrated by a driving pin, which ensures that the driving ring of the slide housing surrounding the slides, is pulled during the rotational movement. However, the driving pin is arranged in such a way that itself and consequently the slide housing is only removable once the girder bridge has been dismounted. This means that extensive mounting labor is necessary in order to gain access to the bearings of the spindle and the drive shaft for example.

U.S. Pat. No. 4,846,652 discloses an automatizable coupling device in which for coupling of the feed screw a rotatable slide is fixed in a driving piece by means of a cover screwed on the spindle of the motor. However, in practice it has turned out that the two linked pieces of this thread connection are pressed together so strongly that they can only be released with great difficulty.

Further coupling devices of this kind are known from German Patent 32 29 223. In these devices it is always necessary no remove the spindle in order to make possible an exchange of the bearings of the spindle of the motor.

SUMMARY OF THE INVENTION

It is an object of the invention so to design a coupling device which is of the kind described above and which, in spite of its simple construction is easy to maintain and economical to make.

That object is accomplished in accordance with the invention in that the seat is connected to first bore holes of the spindle by threaded bolts: the first bore holes being inclined to a plane laid through the injection axis.

Such an arrangement offers the advantage that the seat for the axial locking means is easily removable and thus the time required for the maintenance can be reduced to a minimum. The maintenance staff merely has to unscrew the threaded bolts, which during the injection operation are mainly stressed axially and in that do not tend to a tightening of the thread connection as a result of the rotational movement. That way the conditions for an exchange of the bearings of the spindle, after removal of the seat for the axial locking means, with help of the most simple means. are created. It is not necessary anymore to dismount the complete injection bridge for exchange of only one bearing. This means that the maintenance staff can carry the tools necessary for the maintenance in a briefcase. Since a rapid maintenance heightens the customers' contentment and the arrangement of several threaded bolts additionally facilitates the assembly in the manufacturing company, the expenditure necessary for providing threaded drill holes diving diagonally into a shaft is willingly accepted.

According to a preferred feature several threaded bolts, which are accessible from outside a front side, are received in the first bore holes of the spindle and together with the injection axis form an acute angle. In such an arrangement the basic prerequisites for an automatization of the coupling device are created in that the seat juts out from the injection bridge. It is, however, possible to place automatic operating mechanisms in this region without problems.

According to preferred features the seat is provided with a second recess for a guiding element of the axial locking means, whereby the guiding element is detachably mounted in the second recess by means of threaded bolts. Furthermore slides arranged in the guiding element diametrically with respect to the injection axis are radially displaceable, whereby the slides are guidable into a radial recess of the feed screw by means of springs. The slides are uncouplable by an expanding key guided radially with respect to the injection axis. In such an arrangement a safe operation of the axial locking means is ensured in spite of a simple mounting at the front side of the spindle. In this embodiment the device is also already prepared for a future automatization by the arrangement of the springs in the way described before, since the uncoupling always occurs opposed to the force of the springs.

BRIEF DESCRIPTION OF THE DRAWING

FIG. 4 is a sectional view according to the lines IV—IV of FIG. 3 when the axial locking is bolted.

FIG. 5 is a presentation according to FIG. 4 when the axial locking is unlatched.

FIG. 5 shows a vertical section through the spindle and coupling device when drive shaft and feed screw are removed.

FIG. 7 is a frontal view of the coupling device according to FIG. 6.

FIG. 8 is an exploded view of the coupling device according to FIG. 6.

DETAILED DESCRIPTION OF THE PREFERRED EMBODIMENT

The invention will now be described in more detail by example with reference to the embodiment shown in the Figures. It should be kept in mind that the following described embodiment are only presented by way of example and should not necessarily be construed as limiting the inventive concept to any particular physical configuration.

Figure 1:
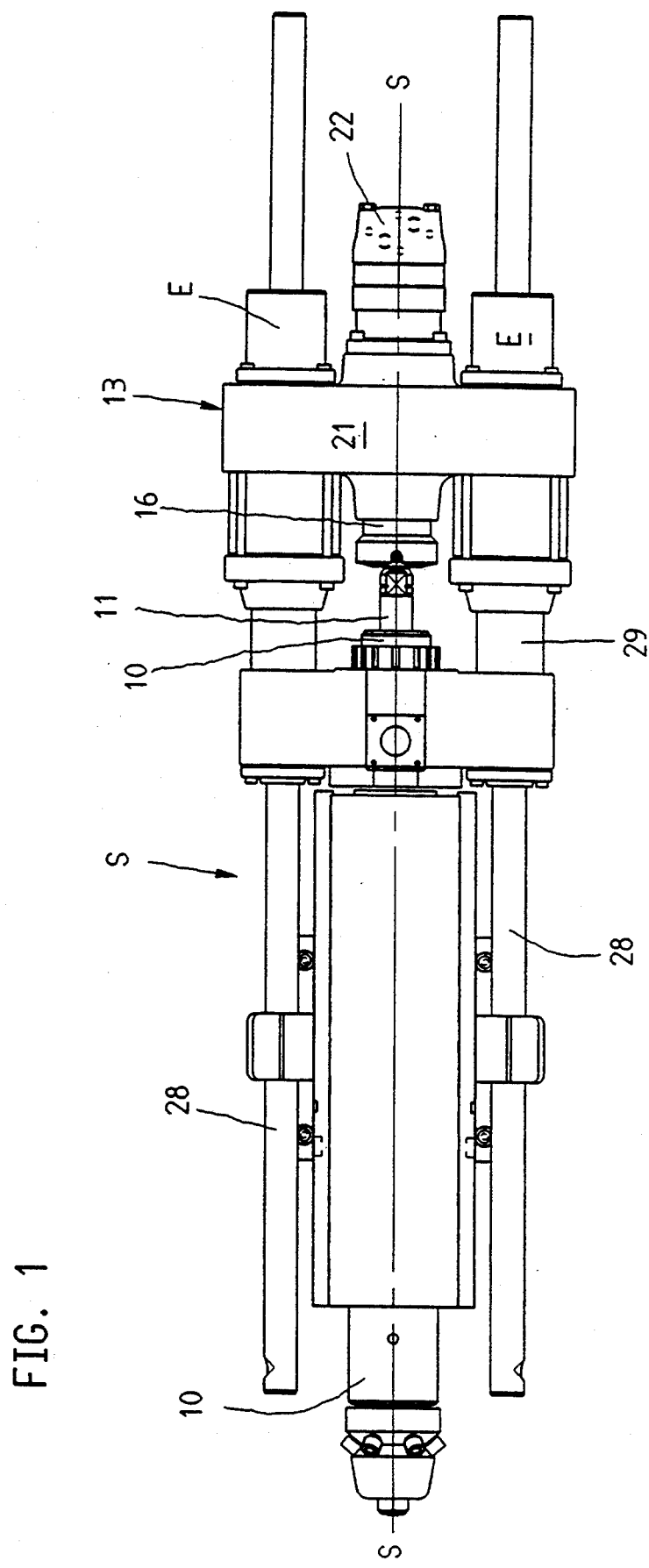
FIG. 1 is a top view of an injection molding unit comprising a coupling device.

According to FIG. 1 the coupling device is used in an injection molding unit S of an injection molding machine for processing synthetic materials. A feed screw 11, rotatable by means of a revolving motor 22, is arranged in a detachable plasticizing cylinder 10. The injection molding unit is axially displaceable during the injection operation by drive means, which in this embodiment are drive cylinders 29 provided with piston rods 28 being guide rods fixed at the mold carrier of the injection molding machine for processing synthetic materials. The axial movement of the feed screw 11 is effected via the injection cylinders E. Thus the injection cylinders E and the revolving motor 22 together constitute the drive device operable to generate the rotational movement and the axial displacement of the feed screw 11. The axial movement of the injection cylinders is thereby transmitted via an injection bridge 21, which bears the revolving motor 22, to the coupling device and consequently on no the feed screw provided that the feed screw 11 is in a coupled position.

Figure 2:
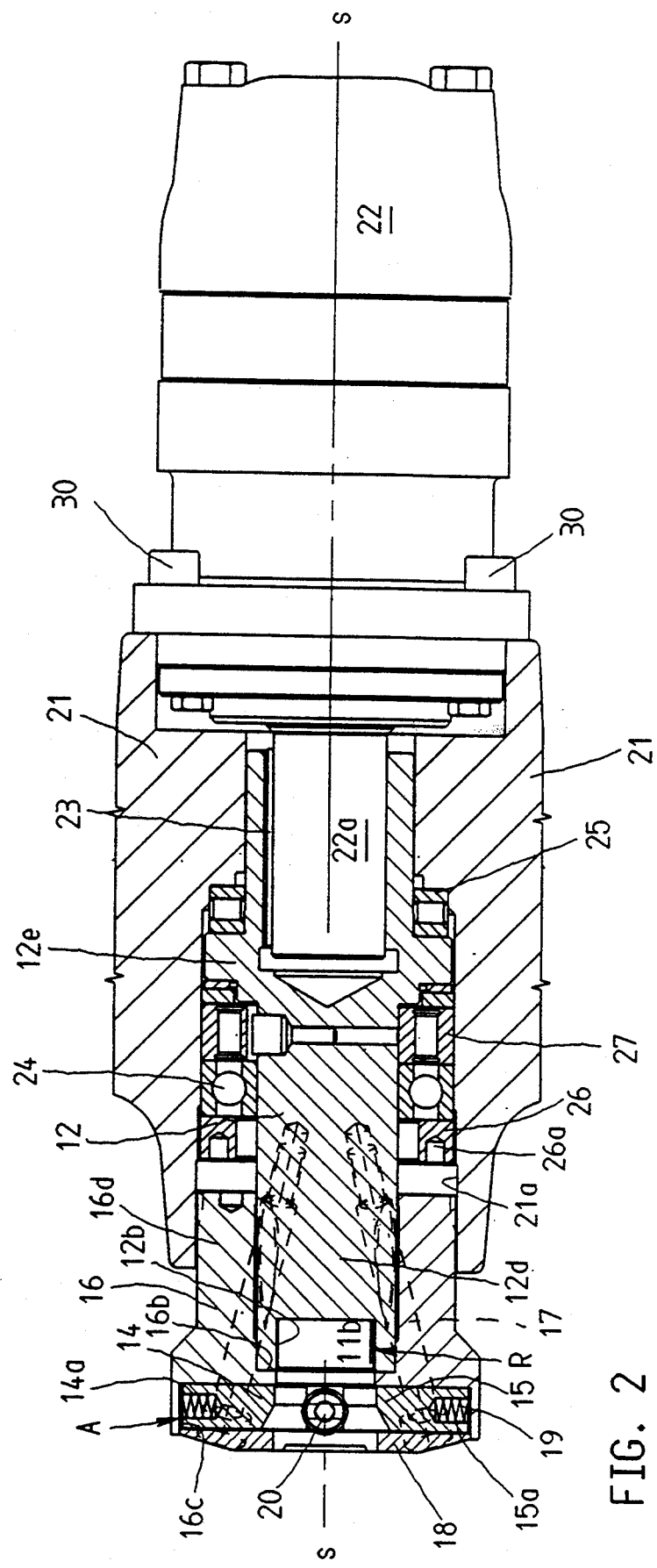
FIG. 2 is an enlarged, partially sectional view of a part of FIG. 1 in the area of the coupling device.
Figure 3:
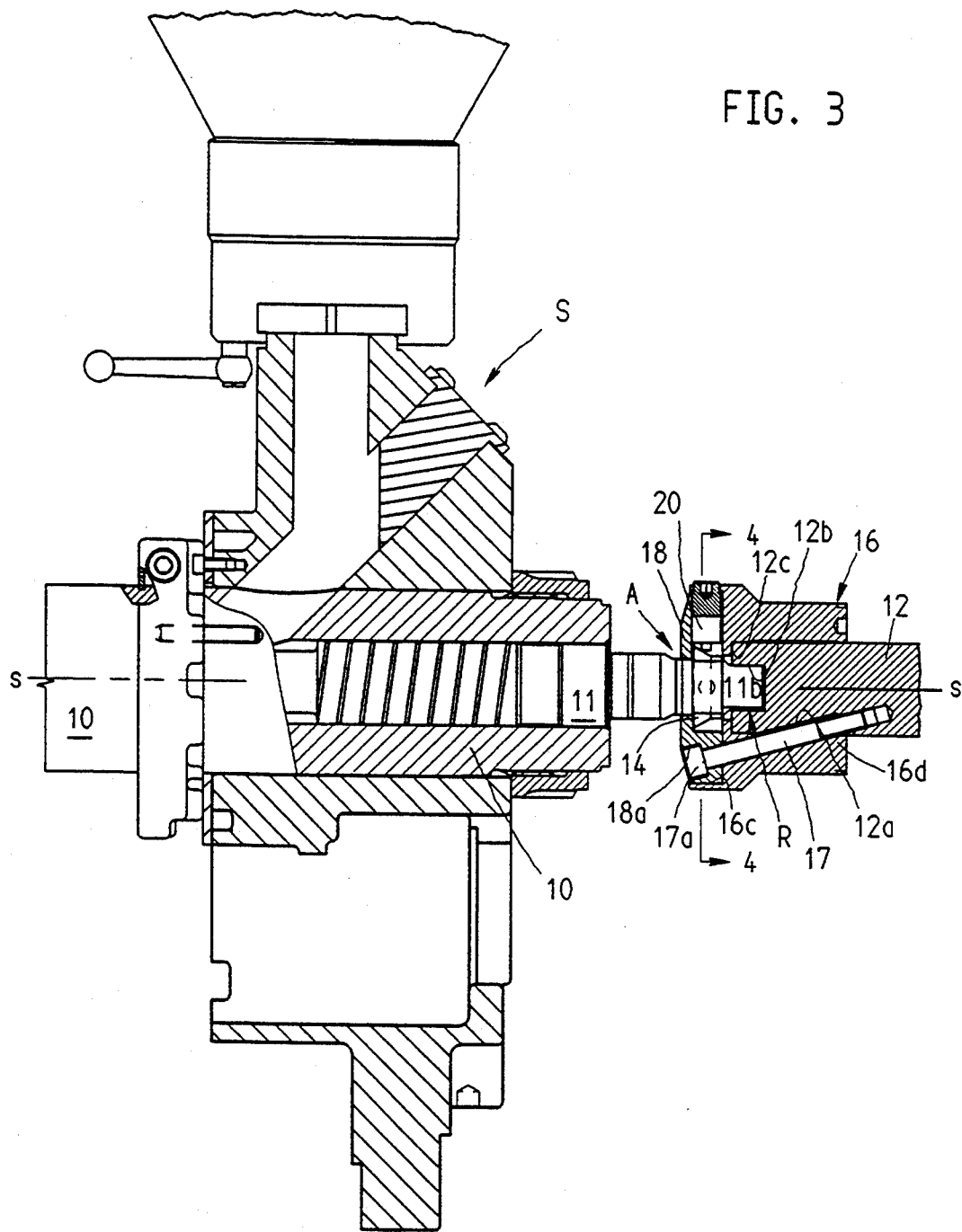
FIG. 3 is a vertical section through the injection molding unit with the coupling device when the injection bridge is removed.

As is apparent from FIG. 2 the axial locking means A is located in front of the form-fit, axially decouplable radial coupling. Whereas the axial locking means ensures the axial pulling of the feed screw, the rotational forces transmitted by the revolving motor 22 to a spindle 12 are again transmitted to the feed screw 11 by means of the radial coupling R. The axial locking means also subject to the rotational movement comprises locking elements which in this embodiment are two slides 14, 15 and constitute the coupling part of the injection molding unit. The axial locking means A is received in a seat 16, which is detachably connected to the rotational drive by means of several threaded bolts 17. According to FIGS. 2 and 8 the seal is linked with first bore holes 12a of the spindle 12 by means of threaded bolts, inclined to a plane laid through the axis s—s. As can be seen from FIG. 8 the threaded bolts 17 in built-in position and the axis s—s form an acute angle α and are accessible from outside (FIG. 3).

The threaded bolts for fastening the axial locking means A surround the coupling part of the radial coupling R. This coupling part is formed by a first recess 12b at the front side of the spindle 12. The seat 16 is merely slipped onto the spindle, whereby a radial inner flange 16b serves as support at the front side 12c of the spindle in order to limit the axial displacement of the seat. An introduction of the threaded bolts 17 is possible into the first bore hole 12a of the spindle, which in its lower section is also provided with a thread, as soon as the second bore hole 16a is in alignment with the first bore hole 12a after rotating the seat (if such rotation is required).

The axial locking means A itself is provided in a recess 16c at the seat. A guiding element 18 is fixed inside this recess 16c by means of the threaded bolts 17. The guiding element 18 also has bore holes 18b for penetration of the threaded bolts 17 and an enlarged location hole 18a for reception of the head 17a of the threaded bolts 17, which are provided with a thread section 17b.

As is especially apparent from FIGS. 4 and 5, inside the guiding element 18 two slides 14,15, conducted by guide surfaces 18c, are arranged diametrically with respect to the axis s—s. The radially displaceable slides for axial coupling are introducible into a radial recess 11a of the feed screw by means of springs 19. Simultaneously a coupling 11b penetrates into the first recess 12b at the front side of the spindle 12 in order to transmit the rotational movement of the motor 22. Moreover the guiding element is provided with a recess for receiving an expanding key 20. The expanding key has an expanding strip 20b, which expands the two slides against the force of the springs as a result of a turning movement, as soon as the expanding key 20 is moved via the actuating opening 20a. Of course, it is also possible to use other expanding elements such as conically formed, radially movable expanding pins and to automatize the actuation of the expanding key. As can be seen from FIG. 4, the slides 14, 15 are provided with slopes 14b, 15b, which engage in the corresponding recesses of the feed screw 11.

The seat 16 itself is merely slipped on the spindle 12 and can be removed after the threaded bolts have been unscrewed. The diagonal arrangement of the threaded bolts requires a large region in which it is not possible to locate a thread connection. On the other hand possibly arising shearing forces, which might especially be generated in the acceleration phase and when the speed is reduced, can be transmitted to a larger shear surface of the threaded bolts 17.

The drive shaft 22a of the motor 22 transmits the rotational movement to the spindle 12 by means of a driver 23. The spindle is provided in its rear end section with a radial flange 12e having nearly the same outside diameter as a rear end section 16d of the seat 16. The diameter of these two parts is nearly the size of the inner diameter of a third bore hole 21a of the injection bridge 21, which serves to receive the two parts. At its front end section 12d the spindle has a constant outside diameter substantially corresponding to the bore hole of a nut 26, which is insertable into a thread section 21b of the third bore hole by means of actuating openings 26a. Thereby on the one hand the nut fixes the bearings 24 and 25 arranged deeper in the third bore hole 21a of the injection bridge 21 when the thread is actuated and since it fits closely at the spindle at the same time it seals this region against dirt accumulations. The penetration of dirt is also prevented since the outside diameter of the seat 16 coincides with the inner diameter of the third bore hole 21a. Nevertheless wearing parts such as bearings remain easily accessible. The assembly of the unit can most clearly be seen in FIG. 2. First, the motor 22 engine is connected with the injection bridge by means of the studs 30 in a torsion-resistant manner. Then as shown in FIG. 2, the spindle is introduced from the left side, which in FIG. 2 on the right side of the radial flange 12e is already provided with the bearing 25. Afterwards the free wheel 27 and the bearing 24 can be arranged in the third bore hole 21a via the front end section 12d of the spindle, having a constant diameter, and they are fixed by the nut 26. Subsequently the spindle, shown in FIG. 8 in a exploded view, is at first equipped with the attachable seat. Then the axial locking means A comprising the guiding element 18, the slides 14, 15 and the expanding key 20 are inserted into the second recess 16c of the seat 16. Being in this position the parts are connected to the spindle 12 by means of the threaded bolts 17. The simple mounting and dismounting method of the coupling device can most clearly be appreciated from FIG. 2.

The earlier-noted free wheel 27 has the task to prevent a reverse turning of the feed screw during the injection operation, which might be caused by the resistances arising in the mold cavity when the material is injected.

It will be understood that the above description of the present invention is susceptible to various modifications, changes and adaptations, and the same are intended to be comprehended within the meantime and range of equivalents of the appended claims.

I claim:

1. In an injection molding unit including
   a detachable plasticizing cylinder having a longitudinal center line which defines an injection axis,
   a feed screw mounted in said plasticizing cylinder and operable to rotate about said injection axis and to shift axially along said injection axis,
   a drive device operable to generate a rotational movement and an axial displacement of said feed screw and comprising a spindle coaxially arranged with respect to said injection axis,
   a coupling device for coupling said spindle with said feed screw; said coupling device including
   at least one axial locking means for coupling said rotatable and axially displaceable feed screw with said spindle,
   at least one locking element constituting a part of said locking means,
   a seat oriented towards said feed screw for receiving said locking element, and
   threaded bolts detachably connecting said seat to said drive device,
   the improvement wherein
   said spindle is provided with several bore holes inclined to a plane containing said injection axis,
   said threaded bolts are received by said bore holes inside said spindle, and
   said seat is connected to said bore holes of said spindle by said threaded bolts.

2. The improvement set forth in claim 1, wherein said threaded bolts received in said bore holes of said spindle together with said injection axis form an acute angle and are accessible from outside a front side of said spindle; said front side being oriented toward said feed screw.

3. The improvement set forth in claim 1, wherein said bore holes are first bore holes and further wherein said threaded bolts penetrate said seat through second bore holes, said second bore holes being in alignment with said first bore holes of said spindle when said seat is slipped on said spindle in a mounting position, said seat having a radial inner flange lying against a front side of said spindle.

4. The improvement set forth in claim 1, wherein a rear end section of said seat slippable on said spindle extends to a bore hole of an injection bridge which carries a motor forming part of said drive device, said motor being operable to generate a rotational movement of said feed screw, further wherein an outside diameter of said rear end section of said seat substantially corresponds to an inside diameter of said bore hole of said injection bridge.

5. The improvement set forth in claim 1, wherein said spindle has an end face oriented toward said feed screw; further comprising a recess formed in said end face; said feed screw having a coupling portion form-fittingly introducible into and withdrawable from said recess upon relative axial displacement between said feed screw and said spindle; said coupling portion and said recess forming a radial coupling for torque-transmittingly connecting said spindle with said feed screw; said recess being surrounded by said threaded bolts and being situated axially adjacent said axial locking means.

6. The improvement set forth in claim 1, further comprising a recess provided in said seat; a guiding element forming part of said axial locking means and being guided in said recess; said threaded bolts detachably securing said guiding element in said recess.

7. The improvement set forth in claim 6, further comprising slides received in said guiding element at diametrically opposite locations with respect to said injection axis; said slides being radially displaceable; springs urging said slides towards one another; said feed screw having a radial recess; and said slides being introducible in said radial recess by said springs.

8. The improvement set forth in claim 7, further comprising an expanding key supported in said seat and cooperating with said slides for moving said slides away from one another against forces of said springs for uncoupling said slides from said feed screw.

9. The improvement set forth in claim 4, further comprising a screw nut received in said bore hole of said injection bridge; said spindle having a front end section of constant diameter; said front end section being at a close fit with said bore hole of said injection bridge; further comprising bearings disposed in said bore hole of said injection bridge; said bearings being axially fixed by said screw nut.

* * * * *